US009500872B2

United States Patent
Boudreau et al.

(10) Patent No.: US 9,500,872 B2
(45) Date of Patent: Nov. 22, 2016

(54) GLASS ENCAPSULATED POLYMERIC LENTICULAR SYSTEM FOR AUTOSTEREOSCOPIC DISPLAY

(71) Applicants: Robert Addison Boudreau, Corning, NY (US); Ying Zhang, Horseheads, NY (US)

(72) Inventors: Robert Addison Boudreau, Corning, NY (US); Ying Zhang, Horseheads, NY (US)

(73) Assignee: CORNING INCORPORATED, Corning, NY (US)

( * ) Notice: Subject to any disclaimer, the term of this patent is extended or adjusted under 35 U.S.C. 154(b) by 168 days.

(21) Appl. No.: 13/690,281

(22) Filed: Nov. 30, 2012

(65) Prior Publication Data
US 2014/0153091 A1 Jun. 5, 2014

(51) Int. Cl.
*G02B 27/22* (2006.01)
*B82Y 30/00* (2011.01)
*B82Y 20/00* (2011.01)

(52) U.S. Cl.
CPC ............ *G02B 27/2214* (2013.01); *B82Y 20/00* (2013.01); *B82Y 30/00* (2013.01); *G02B 27/22* (2013.01)

(58) Field of Classification Search
CPC G02B 27/2214; G02B 3/0062; G02B 27/22; G02B 27/2217
USPC .................. 359/462–463, 619–628
See application file for complete search history.

(56) References Cited

U.S. PATENT DOCUMENTS

| | | | | |
|---|---|---|---|---|
| 6,069,650 A | * | 5/2000 | Battersby | 348/59 |
| 6,366,406 B1 | * | 4/2002 | Hamanaka et al. | 359/619 |
| 8,177,408 B1 | * | 5/2012 | Coleman | 362/615 |
| 8,625,196 B2 | * | 1/2014 | Louwsma | 359/463 |
| 2008/0080048 A1 | | 4/2008 | Saishu et al. | 359/463 |
| 2009/0067168 A1 | | 3/2009 | Steffen et al. | 362/231 |
| 2009/0225154 A1 | * | 9/2009 | Raymond et al. | 348/51 |
| 2011/0211135 A1 | * | 9/2011 | Sharp | G02B 27/2264 349/15 |
| 2012/0094100 A1 | | 4/2012 | Takagi et al. | 428/215 |
| 2012/0097219 A1 | | 4/2012 | Takagi et al. | |
| 2012/0135210 A1 | * | 5/2012 | Walker et al. | 428/212 |

FOREIGN PATENT DOCUMENTS

WO 2010077667 A2 7/2010
WO WO2011152380 A1 8/2011 ............. B32B 17/10

OTHER PUBLICATIONS

Corning 0211 Microsheet, Product Information, PI0211, Issued: Jun. 2006, Corning Corporation, Corning, NY, USA, http://coresix.com/files/1513/8375/8935/0211.pdf.*
Auch et al.; "Ultrathin glass for flexible OLED application"; Thin Solid Films 417 (2002); pp. 47-50.
Seal et al.; "Mechanical behavior of glass polymer multilayer composites"; Journal of Materials Science 38 (2003); pp. 1063-1071.

* cited by examiner

*Primary Examiner* — Bumsuk Won
*Assistant Examiner* — William R Alexander
(74) *Attorney, Agent, or Firm* — Kevin M. Able

(57) ABSTRACT

A lenticular system for autostereoscopic display devices in which a transparent polymeric lenticular array is embedded between two glass sheets and the gap between the polymeric lenticular array and the outer cover is filled with a transparent polymeric filling having a refractive index different than the refractive index of the polymeric lenticular array to reduce glare.

10 Claims, 5 Drawing Sheets

GLASS ENCAPSULATED POLYMERIC LENTICULAR SYSTEM FOR AUTOSTEREOSCOPIC DISPLAY

ABSTRACT

The present invention relates to autostereoscopic displays and, more particularly, to an improved lenticular system for autostereoscopic displays in which a polymeric lenticular array is encapsulated between two support pieces of flat glass.

BACKGROUND

Autostereoscopic 3D enables a user to observe three dimensional images without wearing special 3D glasses. With the increasing popularity of 3D imaging, autostereoscopic 3D displays are gaining popularity in several product areas, such as hand held mobile devices, tablets, laptops, monitors, TVs, as well as signage and industrial displays. Also, movie theaters, as well as in such high resolution applications as are necessary in medical devices including CAT scans, ultrasonic equipment, x-ray surgery, and in military and public information displays utilize such displays. Anything from big magazines to billboards are becoming increasingly popular. One major type of autostereoscopic 3D technology is to use a lenticular array (sometimes "lenticular) to project images to the eyes and create a 3D illusion. The lenticular array or grating is formed by a plurality of a cylindrical lenses that create views of the image that are different for each eye of the viewer when the lenticular array is placed in front of a pixelated image source. The lenticular array needs to be manufactured with micron-scale accuracy in order to properly locate the cylindrical lenses relative to the pixels of the image source.

Conventionally, such lenticular arrays are made of plastics, which can be fabricated on an industrial scale by injection molding, extrusion, press embossing, or UV embossing at very low cost. Plastic lenticular arrays, however, suffer from several intrinsic issues such as dimensional instability from thermal expansion and mechanical stretching, clinical and UV instability of materials, poor scratch resistance, difficulty in cleaning, dim images due to light scattering and light reflection from curved and lenticular surfaces.

An alternative to plastic lenticulars is an all glass lenticular array which offers several advantages such as low thermal expansion, high mechanical stability, chemical resistance, scratch resistance, but such glass lenticulars are expensive, and a practical way to reduce costs with high quality glass lenticulars is still hard to achieve. Furthermore, because it is difficult to apply anti-glare and anti-reflection coatings on a curved lenticular surface, glass lenticulars will also suffer from image degradation issues due to light scattering reflections.

Further, besides plastic and glass lenticulars, there are hybrid type lenticular systems where plastic lenticular arrays have been bonded onto an underlying flat piece of glass substrate to provide better dimensional stability. This approach still has issues with warping, and as the external surface is still plastic, its chemical and mechanical durability is poor, and the light reflection/scattering issue is still unsolved.

SUMMARY

With the rapid development of lightweight, flexible thin glass, the inventors here have determined that a lenticular system that encapsulates a plastic lenticular array between two pieces of flat glass may be used to address many of the concerns mentioned above and provide a better solution. This lenticular system combines the advantages of both plastic lenticular lens arrays and a glass surface. This new system addresses several of the key issues known heretofore. Starting with a polymeric lenticular array deposited upon only thick or thin glass sheet or base, a second glass cover is provided atop the polymeric lenticular. As will be more fully explained, hereinafter, the gap between the polymer and the protective cover is filled with a transparent polymeric material having a significantly different refractive index from the lenticular polymer so that the lenticular function is preserved. This polymeric filling with the significantly different refractive index minimizes the light reflected at the interface between the polymeric lenticular and the polymeric filling. Such a sandwiched glass/plastic/glass lenticular structure provides unique advantages over conventional plastic lenticular lens arrays, glass lenticular lens arrays, or hybrid lenticular lens arrays.

The top flat glass surface will provide a light weight, chemical and mechanically protected plastic lenticular lens array. The refractive index contrast between the lenticular polymer and the polymeric filling can be controlled and optimized for 3D display lensing effect, while at the same time reducing light reflected at the interface between the polymeric lenticular lens array sheet and the polymeric filling. The sandwiched structures with glass outer layers also offers a compensation mechanism that can significantly reduce lenticular warping which may otherwise occur due to differences in thermal expansion coefficients. The resulting structure has balanced stresses due to its symmetry.

Further, the use of thin, flexible glass makes the fabrication process compatible with conventional roll-to-roll plastic lenticular fabrication processes, in which the flexible glass and fill polymer materials may both be formed onto the plastic lenticulars by similar roll-to-roll processes. The thin flexible glass cover also allows the lenticular system to retain the touch screen function when desired. Thin flexible glass will also minimize the overall weight and thickness.

Because the top surface is glass, it offers good mechanical stability and scratch resistance. Further since the glass top surface offers better chemical resistance, it also serves as a barrier to prevent exposure of the polymeric lenticular array to environmental moisture and chemicals. Flat surfaces on both sides of the plastic lenticular element now also permit uniform optical coatings and allow for easier cleaning. This new structure can be readily integrated into roll-to-roll plastic production processes at relatively low cost.

BRIEF DESCRIPTION OF THE DRAWINGS

These and other aspects are better understood when the following detailed description is read with reference to the accompanying drawings, in which.

DETAILED DESCRIPTION OF A PREFERRED EMBODIMENT

Exemplary embodiments will now be described more fully with reference to the accompanying drawings. Whenever possible, the same referenced numerals are used throughout the drawings to refer to the same or like parts. However, aspects may be embodied in many different forms and should not be construed as limited to the embodiments set forth herein.

Figure 1:
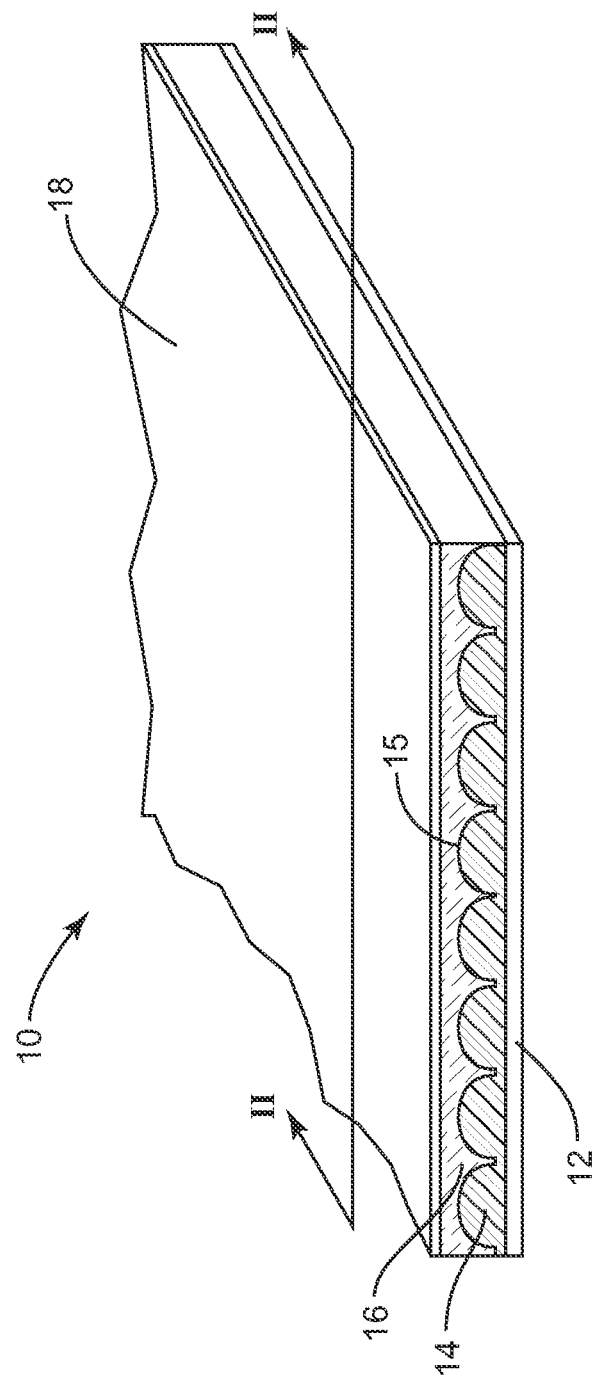
FIG. 1 is perspective view of a polymeric lenticular system according to the present invention.
Figure 2:
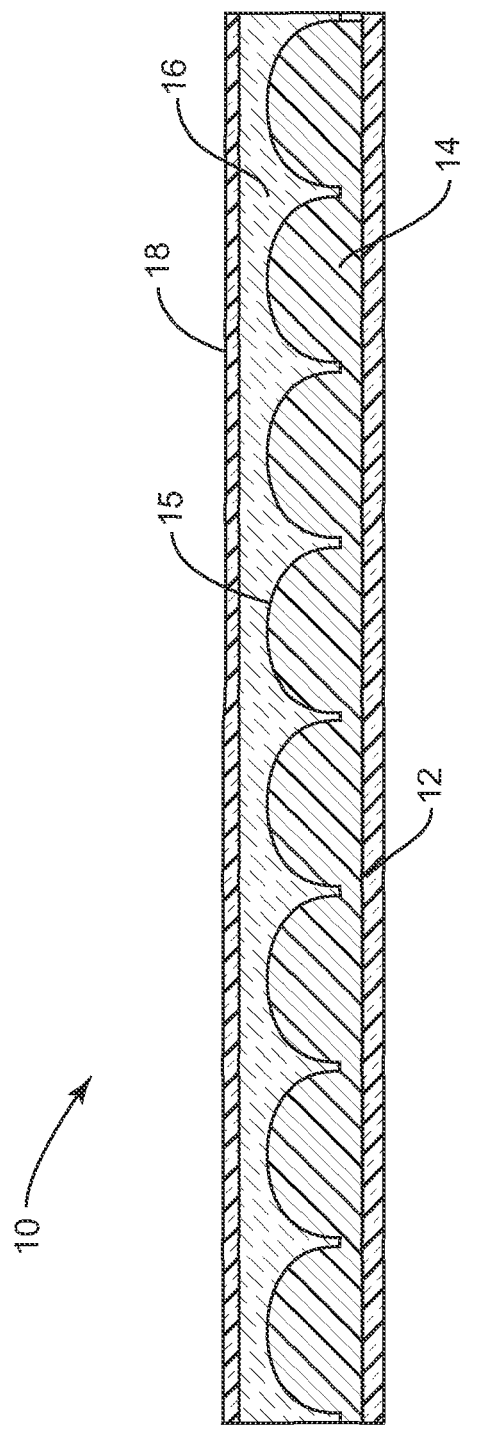
FIG. 2 is a cross sectional view taken substantially along lines II-II in FIG. 1.

Referring now to FIG. 1, there is illustrated an exemplary embodiment of a polymeric lenticular system 10. The polymeric lenticular system 10 includes a glass base substrate 12, a lenticular array 14 formed of a polymeric material, a polymeric filling layer 16, and a glass cover 18. The polymeric lenticular array 14 includes a plurality of longitudinally extending, cylindrical projections 15 that protrude from one side opposite the glass base substrate 12. Glass base substrate 12, and glass cover 18 each of which may be formed from a sheet of glass, for example an ultra-thin glass. The term "thin" or "ultra-thin," as used herein, is meant to include thicknesses between 10 μm and 300 μm, more preferably between 95 μm and 105 μm. A 100 μm thickness is a good example of an ultra-thin glass for some.

The cross-sections of the cylindrical projections may be shaped to have a convex side, such as a semi-circle. Thus, as used herein, reference to a cylindrical lens may denote a lens comprising only a portion of a cylinder. The cylindrical projections of lenticular lens array 14 are arranged in rows that may be substantially parallel to one another. A transparent polymer 16 fills the space between the lenticular lens array 14 and the glass cover 18.

The glass base substrate 12 and the glass cover 18 of the lenticular lens array may be formed from sheets of glass produced by a variety of methods. For example, the glass sheets may be produced by a fusion draw process, a float process, a slot draw process, or any other known or future method of making thin glass sheets. The glass sheet forming the glass cover 18 may be any suitable thickness. For some applications such as movie theatre screens and signage, the thickness is not critical. For other applications, such as hand held mobile devices and tablets, the glass should be thin or ultra-thin. For example, in those instances the thin glass sheet may be between 10 μm and 300 μm and in some embodiments between 95 μm and 105 μm, or for example 100 μm.

Figure 3A:
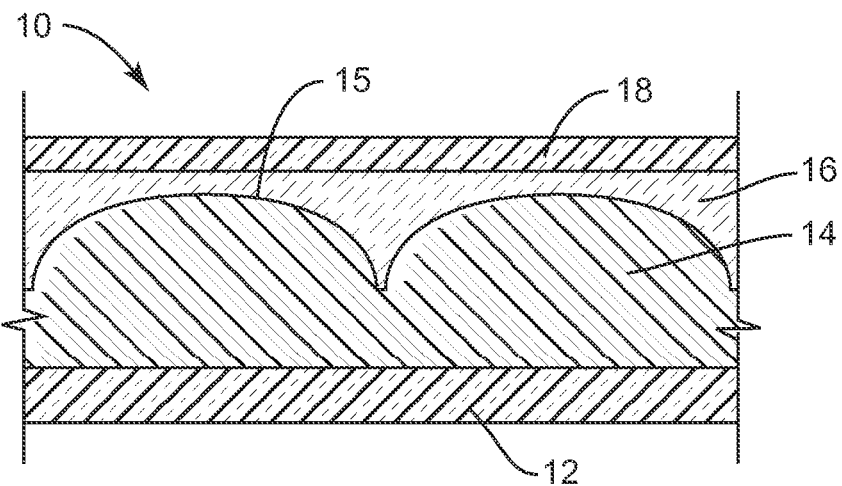
FIGS. 3A-3C are schematic illustrations of various configurations of encapsulated plastic lenticulars with glass outer layers.
Figure 3B:
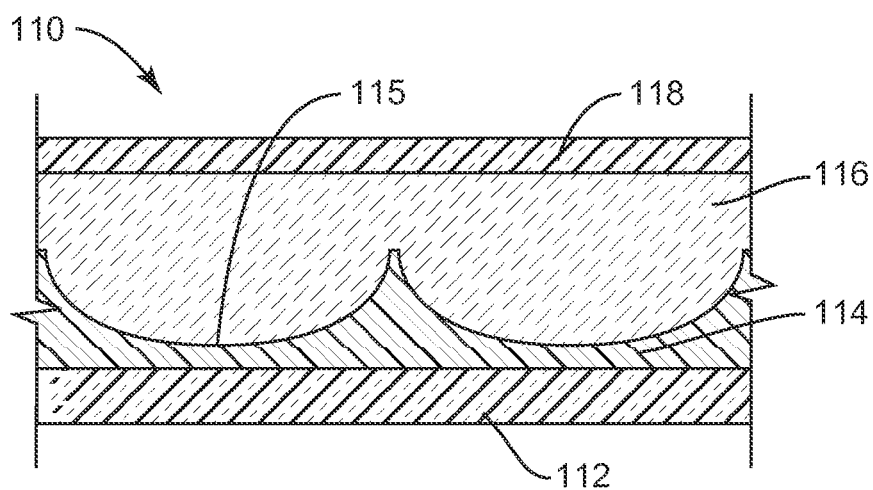
Figure 3C:
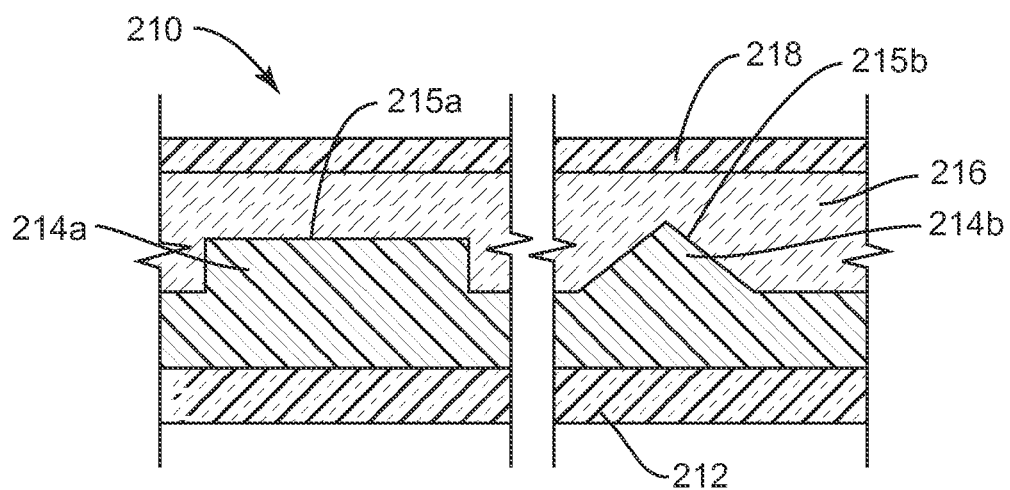

The polymeric lenticular array may be formed in various configurations, as earlier described in FIG. 1 and further illustrated with reference to FIGS. 3A-3C. The polymeric lenticular array 14 may be in the shape of a plate having a plurality of rows of longitudinally extending, semi-cylindrical, convex projections 15 on the upper surface (FIG. 3A). Polymeric lenticular array 14 is attached to glass base substrate 12 with the transparent polymer 16 filling the space between the polymeric lenticular array 14 and the glass cover 18. The number of rows of longitudinally extending projections 15 per inch may vary according to specific needs, but will always be lower than the number of pixels per inch on the underlying device. As a non-limited example, a project count of 40 rows per inch has been found to be suitable for certain applications. As illustrated in FIG. 3B, the lenticular system 110 may be formed with a plate 114 having hollow or concave lenticular sections 115 extending into the upper surface of the plate 114 with a glass substrate 112 therebeneath, and the area between the glass cover 118 and the concave portions 115 filled with transparent polymer 116. FIG. 3C illustrates other shapes of polymeric lenticular lens arrays having longitudinally extending projections (215A, 215B) with other shapes besides cylindrical. Thus, the shapes of the longitudinally extending projections can be convex, concave, or of other arbitrary shape. They can even be double convex, double concave, or concave/prism combinations.

The substrate base glass may either be a thin flexible glass (less than 300 μm thick) when flexibility, production and assembly is preferred or when it is desired to put the lenticular system closer to display pixels. On the other hand, for other applications, the substrate base glass can be thick (greater than 300 μm thick) when substrate rigidity is preferred.

The transparent polymeric material from which the polymeric lenticular array 14 is formed can be of various polymers such as acrylates, acrylamides, epoxies, polyurethane, ester, polyimides, siloxanes, or polymer/inorganic compositor materials. The refractive index of such polymeric materials varies from 1.3 to 3.

The transparent polymer filling layer 16 can also be made of various polymers such as acrylates, acrylamides, epoxies, polyurethane, esters, polyimides, siloxanes, or polymer/inorganic compositor materials. The refractive index of the transparent polymeric materials forming the filling layer can also vary from 1.3 to 3. However, in order to retain the lenticular effect and reduce glare, there should be a refractive index difference between the lenticular polymer and the filling polymer. This refractive index difference between the filling polymer and the lenticular polymer should range from 0.1 to 2, as will be explained more fully hereinafter. The refractive index of the filling polymer can be either larger or smaller than the lenticular polymer, so long as the refractive index difference is maintained.

In addition to the polymer from which the polymeric lenticular array 14 and/or the polymeric filling layer 16 is formed, inorganic-polymer hybrid nanocomposites can also be used as index matching materials. The addition of a minor amount (<50%) of inorganic materials to the either or both polymers in certain applications will enable more freedom in controlling the refractive index and especially to achieve higher refractive indices which is hard to obtain via pure polymer alone. In the hybrid nanocomposites, polymer will still be the main matrix and inorganic materials will serve as additives in the form of nanoparticles. The overall refractive index can then be determined by $n_{hybrid} = n_{polymer} f_{polymer} + n_{inorganic} f_{inorganic}$, where $n_{hybrid}$, $n_{polymer}$, $n_{inorganic}$ are the refractive indexes of inorganic-polymer hybrid nanocomposites, polymer and inorganic nanoparticles; $f_{polymer}$, $f_{inorganic}$ are the volume fractions of polymer matrix and inorganic nanoparticle additives. The size of nanoparticles needs to be smaller than 25 nm to avoid Rayleigh scattering and retain optical transparency. The common types of nanoparticles used are $SiO_2$(N=2.1), $ZnS$(n=2.36), $TiO_2$(anatase, n=2.45, rutile, n=2.7), $PbS$(n=4.2), and amorphous silicon (n=4.23).

The glass cover 18 should be an ultra-thin flexible glass (less than 300 μm thick) when flexible production and assembly is preferred. The glass cover 18 can also be thicker when surface rigidity is preferred. One example of a good thicker glass would be the Corning Gorilla® glass which is on the order of 0.5-2.0 mm, but is very strong and resistant to scratch damage.

As previously discussed, the refractive index of the filling polymer and the refractive index of the lenticular polymers may vary from 1.3 to 3.0. Reflection/glaring on plastic lenticular surfaces have previously caused image quality degradation and impact the experience of 3D users, especially for curved surfaces containing regions that always directly reflect environmental light into the observer's eyes. Although there exists anti-reflection/glaring solutions, such as laminating AR/AG film or depositing AR/AG films onto the surface, the solutions are normally used for flat surfaces, and not adaptable for curved surfaces with micron sized spacing. For curved lenticular surfaces, the unique curve shape surface morphology prevents a seamless lamination of another AR/AG film. Thus, there's a strong need to develop a simple solution to reduce the reflection/glare of lenticular surfaces as is addressed by the present invention.

Figure 4A:
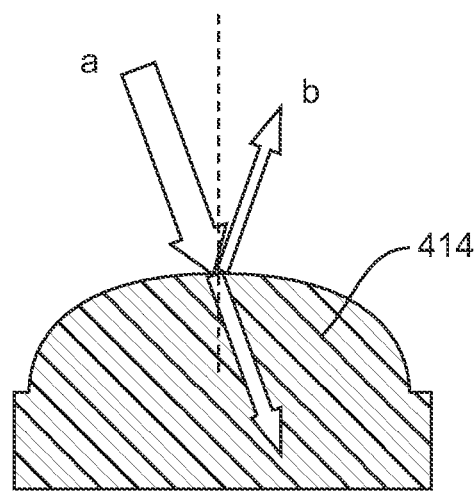
FIGS. 4A and 4B are schematic illustrations comparing the reflection aspects of a lenticular system having a polymer filling between the glass cover and the polymeric lenticular with a lenticular system having an unprotected polymeric lenticular that is just exposed to air.

Accordingly, the filling polymer not only serves as a filling material for the space between the glass cover and the polymer lenticular, but also offers a direct solution to reduce reflection and glaring as will be explained. Looking now at FIG. 4A, there is represented the case of a single lens 414 of a conventional plastic lenticular lens array that is used in current autostereoscopic 3D displays. Conventional plastic lenticular lens arrays are exposed to air (where its refractive index $n_{air}$=1) while a typical refractive index of a plastic lenticular lens array ($n_2$) is normally in the range of 1.5. So, considering normal incidence of a light ray "a" onto the surface of lens 414, the fraction of reflected light "b" can be calculated by the law of reflection intensity according to the formula:

$$I_R/I_o=(n_{air}-n_2)^2/(n_{air}+n_2)^2=(1-1.5)^2/(1+1.5)^2=4\%$$

Figure 4B:
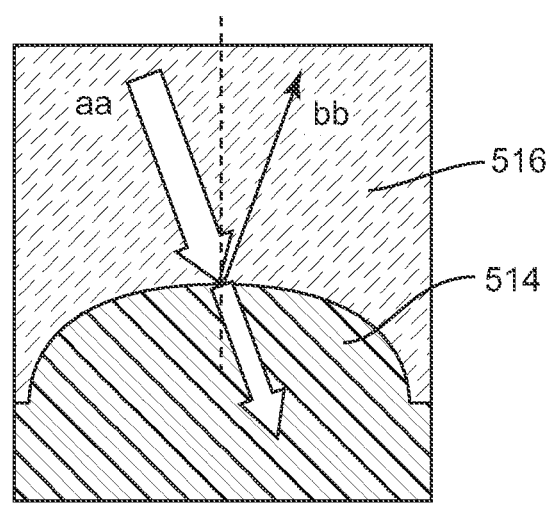

As the refractive index of air is fixed and the refractive index of a polymer material useful for forming a lenticular lens array is normally in the range of 1.5 and it also becomes almost prohibitively expensive and difficult to lower the refractive index of polymer materials, conventional plastic lenticulars have a high reflection rate (~4% at normal incidence). However, if the spacing between the polymer lenticular lens array 14 and the glass cover 18 is filled with a different transparent polymer, the fraction of reflected light can be materially reduced. Note in FIG. 4B the incidence of a light ray aa through the polymer filling 516 onto the surface of lens 514. Now a lesser amount of light bb is reflected. For example, if the filling polymer has a refractive index of 1.4 and the lenticular polymer has a refractive index of 1.5, the reflected light at normal incidence will be:

$$I_R/I_o=(n_1-n_2)^2/(n_1+n_2)^2=(1.4-1.5)^2/(1.4+1.5)^2=0.12\%$$

This resulting percentage of reflected light is significantly reduced compared to the 4% reflection for conventional plastic lenticulars. Further, since the polymer will fill all the space between the glass cover and the polymer lenticular lens array, there will be no air gap left. As the outer surface of the glass cover will be a flat glass surface, conventional AR films or coatings can be easily applied. It should be noted that the index difference between the filling polymer and the lenticular polymer also affects the focus distance of the lenticular lens array. Thus there will be an optimization of refractive index difference to achieve the best optical performance.

Figure 5A:
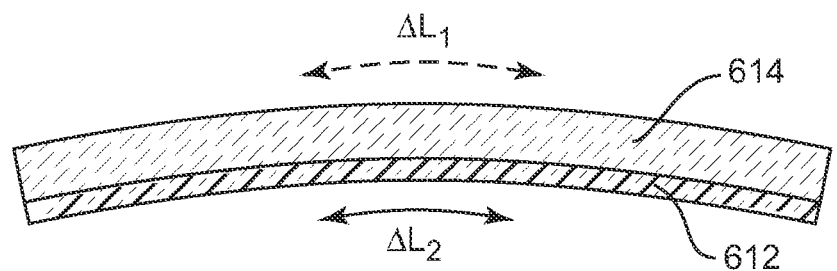
FIGS. 5A and 5B are schematic illustrations comparing the film warping reduction by using double glass encapsulations versus conventional plastic lenticulars.

Glass encapsulation of the polymeric lenticular array will also provide a side benefit, i.e. reduced warping. In order to achieve high quality autostereoscopic display images, pitch variation of the polymeric lenticular array, focus distance variation, and surface unevenness of the polymeric lenticular array 14 must be minimized. As polymer materials have large thermal expansion coefficients, temperature change will significantly affect dimensional stability of the lenticular lens array. It has previously been known that by bonding plastic lenticulars onto a thick glass base substrate, pitch variance and surface unevenness can be somewhat reduced. However, the thick glass will add component thickness and weight. Consider a thin glass base substrate 612 as used with a polymeric lenticular 614, as in FIG. 5A. As the polymer lenticular array 614 has a larger thermal expansion coefficient than the glass of substrate 612, the polymer expansion ($\Delta$ L1) will be larger than glass expansion ($\Delta$ L2). Thus warping will occur to release the expansion stress imbalance.

Figure 5B:
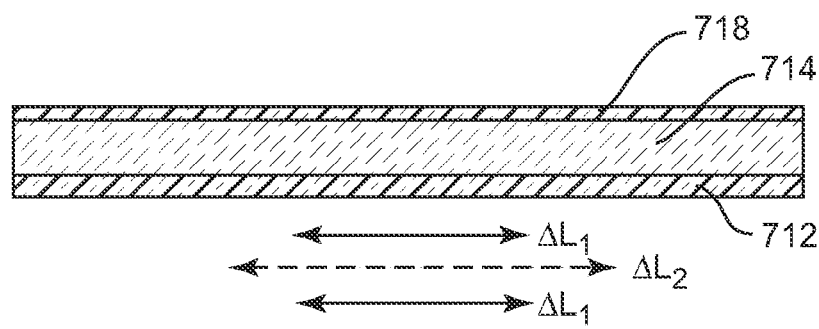

According to the present embodiment, and as illustrated in FIG. 5B, the polymeric lenticular array 714 and its associated polymeric filling layers are encapsulated by the glass base substrate 712 and the glass cover 718. The glass of the glass base substrate 712 and the glass cover 714 can be very thin and may or may not be of the same thickness. These two pieces of thin glass will balance the warping stress and provide improved restriction for lenticular pitch variation, as well as providing flexibility needed for touch screen applications. The overall results will lead to a warping free component with high dimensional stability. The sandwich structure of the glass/polymer/glass will also improve the overall robustness, and the polymer filling layer can serve as an anti-shattering layer.

In one example of using the incapsulated polymeric lenticular array there is first provided a 5×5 inch, 100 micron thick glass base substrate. A 40 lens per inch polymeric lenticular array is formed by UV-embossing from a concave mold. The lenticular polymeric resin is NOA 1625 (Norland Products, Inc.), which is a photo-curable transparent polyurethane resin with a refractive index of 1.625. A liquid filling polymer formed of NOA 84 resin (also from Norland Products, Inc.) with a refractive index of 1.46 is introduced between the polymer lenticular and another 5×5 inch, 100 micron thick glass (glass cover 18). After UV curing of the filling resin, a stable glass encapsulated polymeric lenticular system is obtained. The lenticular system is thin, lightweight, flexible and warp free. The normal incidence reflection rate is only 0.29%, and the light refraction/scattering is minimized.

It will be apparent to those skilled in the art that various modifications and variations can be made without departing from the spirit and scope of the claimed invention.

What is claimed is:

1. An autostereoscopic display device comprising:
   a. a pixelated image source; and
   b. a lenticular system consisting of:
      i. a polymeric sheet formed of a first transparent polymer having a first refractive index and formed in a lenticular array, wherein the thusly formed polymeric lenticular array includes a plurality of longitudinally extending projections arranged in substantially parallel rows on the surface thereof;
      ii. a glass substrate and a glass cover;
      iii. the polymeric lenticular array being sandwiched between the glass substrate and the glass cover, there being a gap between the projections on the polymeric lenticular array and the cover;
      iv. the gap between the glass cover and the projections on the polymeric lenticular array being filled with a filling layer formed of a second transparent polymer having a second refractive index; and
      v. the second refractive index being so related to the first refractive index of the polymeric lenticular array that light reflected at an interface between the polymeric lenticular array and the polymeric filling will not exceed 4% of a total light incident at the interface;

wherein the pixelated image source projects a pixelated image onto the polymeric lenticular display of the lenticular system.

2. The autostereoscopic display device according to claim 1 wherein a difference between the second refractive index and the first refractive index is between 0.1 and 2.

3. The autostereoscopic display device according to claim 1 wherein a thickness of the glass cover is between 50 μm and 300 μm.

4. The autostereoscopic display device according to claim 1 wherein the thickness of the glass cover is between 95 μm and 105 μm.

5. The autostereoscopic display device according to claim 1 wherein the polymeric sheet is formed of a polymer selected from the group consisting of acrylates, acrylamides, epoxies, polyurethane, ester, polyimides, siloxanes, and combinations thereof.

6. The autostereoscopic display device according to claim 1 wherein the transparent polymeric filling layer is a polymer selected from the group consisting of acrylates, acrylamides, epoxies, polyurethane, ester, polyimides, siloxanes, and combinations thereof.

7. The autostereoscopic display device according to claim 1 wherein the longitudinally extending projections are semi-cylindrical in shape.

8. The autostereoscopic display device according to claim 1 wherein the display includes a touch screen and the thickness of both the glass substrate and the glass cover is between 10 μm and 300 μm.

9. The autostereoscopic display device according to claim 1 wherein the polymeric sheet includes less than 50% of inorganic nanoparticle additives having a size of less than 25 nm, whereby the first refractive index may be raised.

10. The autostereoscopic display device according to claim 1, wherein the polymeric filling layer includes less than 50% of inorganic nanoparticle additives having a size of less than 25 nm, whereby the second refractive index may be raised.

* * * * *